US010402862B2

(12) United States Patent
Mikan et al.

(10) Patent No.: US 10,402,862 B2
(45) Date of Patent: Sep. 3, 2019

(54) METHOD AND APPARATUS FOR SELECTING AN ADVERTISER

(75) Inventors: Jeffrey Mikan, Atlanta, GA (US); Andrea Basso, Marlboro, NJ (US); Tara Hines, New York, NY (US); Aleksey Ivanov, Atlantic Highlands, NJ (US); Nadia Morris, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 110 days.

(21) Appl. No.: 13/208,092

(22) Filed: Aug. 11, 2011

(65) Prior Publication Data
US 2013/0041758 A1    Feb. 14, 2013

(51) Int. Cl.
*G06Q 30/02*     (2012.01)

(52) U.S. Cl.
CPC ......... *G06Q 30/0269* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 6,943,672 B2 | 9/2005 | Choi | |
| 6,965,871 B1 | 11/2005 | Szabo et al. | |
| 7,299,982 B2 | 11/2007 | Kreiner | |
| 7,362,228 B2 | 4/2008 | Nycz | |
| 7,367,496 B2 | 5/2008 | Karstens | |
| 7,426,479 B2 | 9/2008 | Otto | |
| 7,827,846 B2 | 11/2010 | Bauchot | |
| 7,931,197 B2 | 4/2011 | Brandt | |
| 8,086,503 B1 | 12/2011 | Mussman et al. | |
| 8,284,056 B2* | 10/2012 | McTigue et al. | 340/10.1 |
| 2001/0049890 A1 | 12/2001 | Hirsch et al. | |
| 2002/0053076 A1* | 5/2002 | Landesmann | G06Q 30/02 725/10 |
| 2002/0133407 A1 | 9/2002 | Walker et al. | |
| 2002/0161652 A1 | 10/2002 | Paulin et al. | |
| 2002/0198795 A1 | 12/2002 | Dorenbosch | |

(Continued)

OTHER PUBLICATIONS

Definition of "To replace," in Dictionary.com Unabridged. Source location: Random House, Inc. http://dictionary.reference.com/browse/replace. Available: http://dictionary.reference.com. Accessed: Mar. 5, 2014.*

(Continued)

*Primary Examiner* — Sam Refai
*Assistant Examiner* — Christopher C Busch
(74) *Attorney, Agent, or Firm* — Guntin & Gust, PLC; Robert Gingher

(57) ABSTRACT

A system that incorporates teachings of the present disclosure may include, for example, a method for receiving a first radio frequency signal from a radio frequency identifier tag carried by a first item, retrieving from the first radio frequency signal information about the first item, and identifying at least one replacement item according to the retrieved information. The method can further include selecting at least one advertiser that promotes at least one product that is at least similar to the at least one replacement item, and selecting a presentation arrangement for the identified at least one advertiser to present the at least one product at a device of a user of the first item. Other embodiments are disclosed.

20 Claims, 7 Drawing Sheets

(56) References Cited

U.S. PATENT DOCUMENTS

| | | |
|---|---|---|
| 2006/0119481 A1 | 6/2006 | Tethrake et al. |
| 2006/0152377 A1 | 7/2006 | Beebe et al. |
| 2007/0011135 A1* | 1/2007 | Chitgupakar ..... G06F 17/30286 |
| 2007/0063029 A1 | 3/2007 | Brandt et al. |
| 2007/0164140 A1 | 7/2007 | Dreimann |
| 2008/0106762 A1* | 5/2008 | Mullender et al. .......... 358/1.16 |
| 2008/0254944 A1 | 10/2008 | Muri et al. |
| 2009/0138328 A1 | 5/2009 | Higgins et al. |
| 2009/0267783 A1* | 10/2009 | Vock .................... A43B 1/0036 340/669 |
| 2009/0278707 A1 | 11/2009 | Biggins et al. |
| 2010/0141457 A1* | 6/2010 | Wass et al. ................ 340/572.8 |
| 2010/0161379 A1 | 6/2010 | Bene et al. |
| 2011/0093324 A1 | 4/2011 | Fordyce, III et al. |
| 2011/0093327 A1* | 4/2011 | Fordyce, III ........... G06Q 20/10 705/14.39 |
| 2011/0113051 A1* | 5/2011 | Lindahl ............. G06F 17/30029 707/758 |
| 2011/0202405 A1 | 8/2011 | Clark et al. |
| 2011/0231250 A1 | 9/2011 | Elbaum et al. |
| 2011/0260834 A1 | 10/2011 | Chapman et al. |
| 2011/0320441 A1* | 12/2011 | Lee ................... G06F 17/30867 707/723 |
| 2012/0123674 A1 | 5/2012 | Perks et al. |
| 2012/0166284 A1 | 6/2012 | Tseng et al. |
| 2012/0190386 A1* | 7/2012 | Anderson .............. G01C 15/04 455/456.3 |
| 2012/0203647 A1* | 8/2012 | Smith ................. G07G 1/0036 705/23 |
| 2016/0358223 A1 | 12/2016 | Mikan et al. |

OTHER PUBLICATIONS

Definition of "equivalent," in Collins English Dictionary—Complete & Unabridged 10th Edition. Source location: HarperCollins Publishers. http://dictionary.reference.com/browse/equivalent. Available: http://dictionary.reference.com. Accessed: Mar. 5, 2014.*
Synonym of "quality" as "value" and vice versa (see htttps://www.google.com/search?q=+quality+synonyms&sourceid=ie7&rls=com.microsoften-us:IE-SearchBox&ie=&oe=.*
C. Saygin, Adaptive inventory management using RFID data, 2006, Int. J. Adv. Manuf. Technol., 32:1045-1051 (Year: 2006).*

* cited by examiner

600

METHOD AND APPARATUS FOR SELECTING AN ADVERTISER

RELATED APPLICATION

U.S. patent application Ser. No. 13/188,491, filed Jul. 22, 2011, by Mikan et al., entitled "Method and Apparatus for Monitoring Usage of Items", U.S. patent application Ser. No. 13/189,703, filed Jul. 25, 2011, by Mikan et al., entitled "Method and Apparatus for Selecting Replacement Items," and U.S. patent application Ser. No. 13/208,144 filed Aug. 11, 2011, by Mikan et al., entitled "Method and Apparatus for Promoting Products or Services." All sections of the aforementioned application(s) are incorporated herein by reference.

FIELD OF THE DISCLOSURE

The present disclosure relates generally to method and apparatus for selecting an advertiser.

BACKGROUND

It is common for consumers to purchase replacement items when they perceive that an item such as a clothing item is out of style or has exceeded its useable life. The purchasing behavior of consumers can often be dictated by perception, seasonal trends, aging of the consumer, a change in the consumer's environment that influences the consumer's behavior, friends, family, local economy, national economy, employment, and so on.

DETAILED DESCRIPTION

The present disclosure describes, among other things, illustrative embodiments for monitoring usage of an assortment of items, identifying replacement items according to the usage, and selecting advertisers to present products that are similar or equivalent to the replacement items. Other embodiments are contemplated by the present disclosure.

One embodiment of the present disclosure includes a device having a memory and a processor coupled to the memory. The processor can be operable to receive usage information from a radio frequency identifier tag carried by a first item and detect a need to replace the first item according to the usage information. Responsive to detecting the need to replace the first item, the processor can be further operable to determine a strategy to replace the first item according to a monitored behavior of a user of the first item, search for one or more replacement items according to the strategy, identify at least one replacement item from results of the search, and select at least one advertiser that promotes at least one product that is equivalent to or substantially similar to the at least one replacement item. The processor can also be operable to select a presentation arrangement for the identified at least one advertiser and cause a notice configured according to the presentation arrangement to be transmitted to a communication device of the user, wherein the notice comprises a proposal for replacing the first item with the product of each of the at least one advertiser.

One embodiment of the present disclosure includes a method for receiving a first radio frequency signal from a radio frequency identifier tag carried by a first item, retrieving from the first radio frequency signal information about the first item, and identifying at least one replacement item according to the retrieved information. The method can further include selecting at least one advertiser that promotes at least one product that is at least similar to the at least one replacement item, and selecting a presentation arrangement for the identified at least one advertiser to present the at least one product at a device of a user of the first item.

One embodiment of the present disclosure includes a method for receiving information from a transmitter coupled to a first consumer item, determining a measure of usage of the first consumer item according to the information, and monitoring a behavior pattern of a user of the first consumer item. The method can further include determining a strategy for replacing the first consumer item according to the behavior pattern the measure of usage of the first consumer item, identifying according to the strategy a second consumer item for replacing the first consumer item, selecting at least one advertiser that promotes at least one product that is similar to the second consumer item, and presenting the at least one product of the at least advertiser according to an order of presentation.

Figure 1:
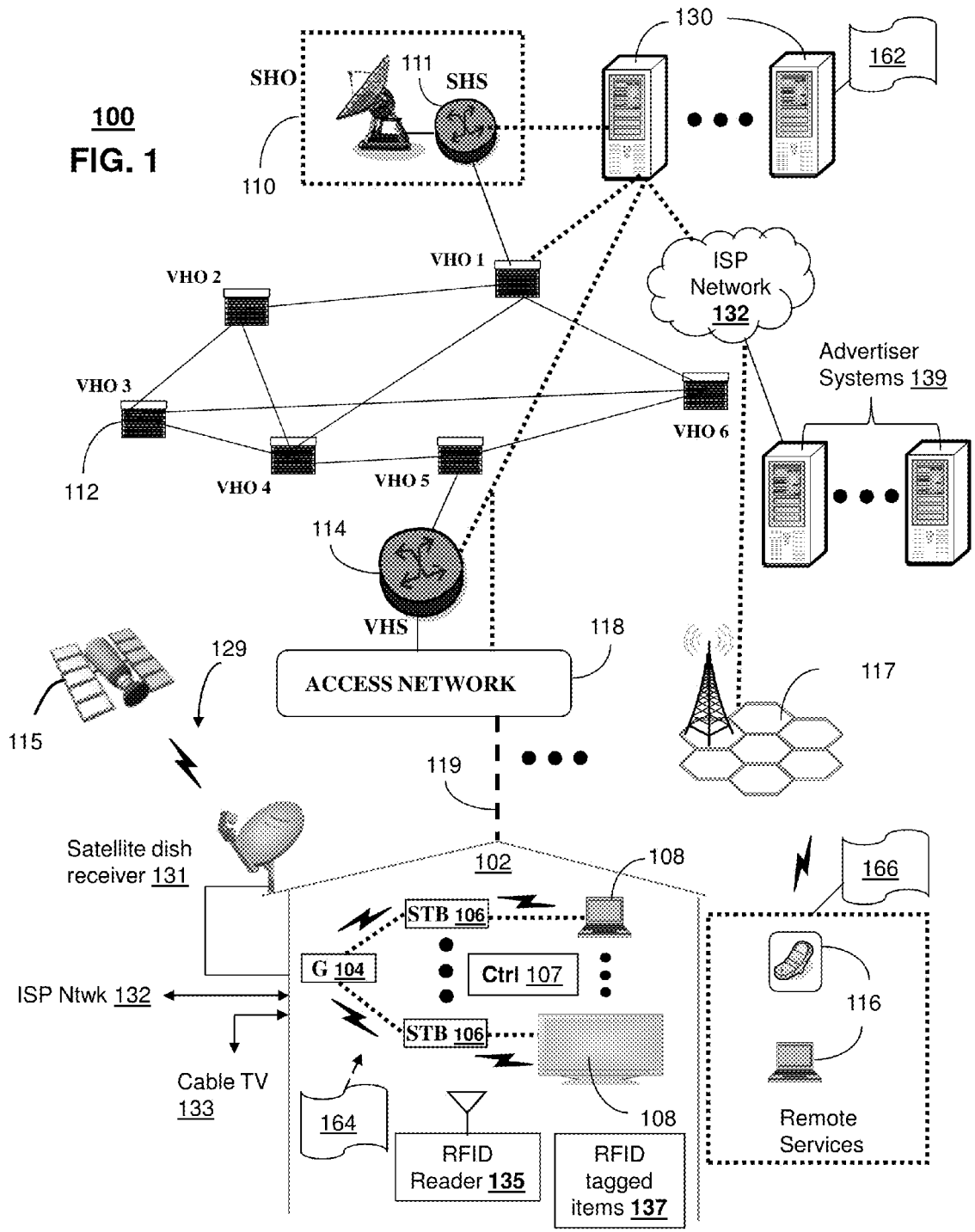
FIGS. 1-2 depict illustrative embodiments of communication systems that provide media services.
Figure 7:
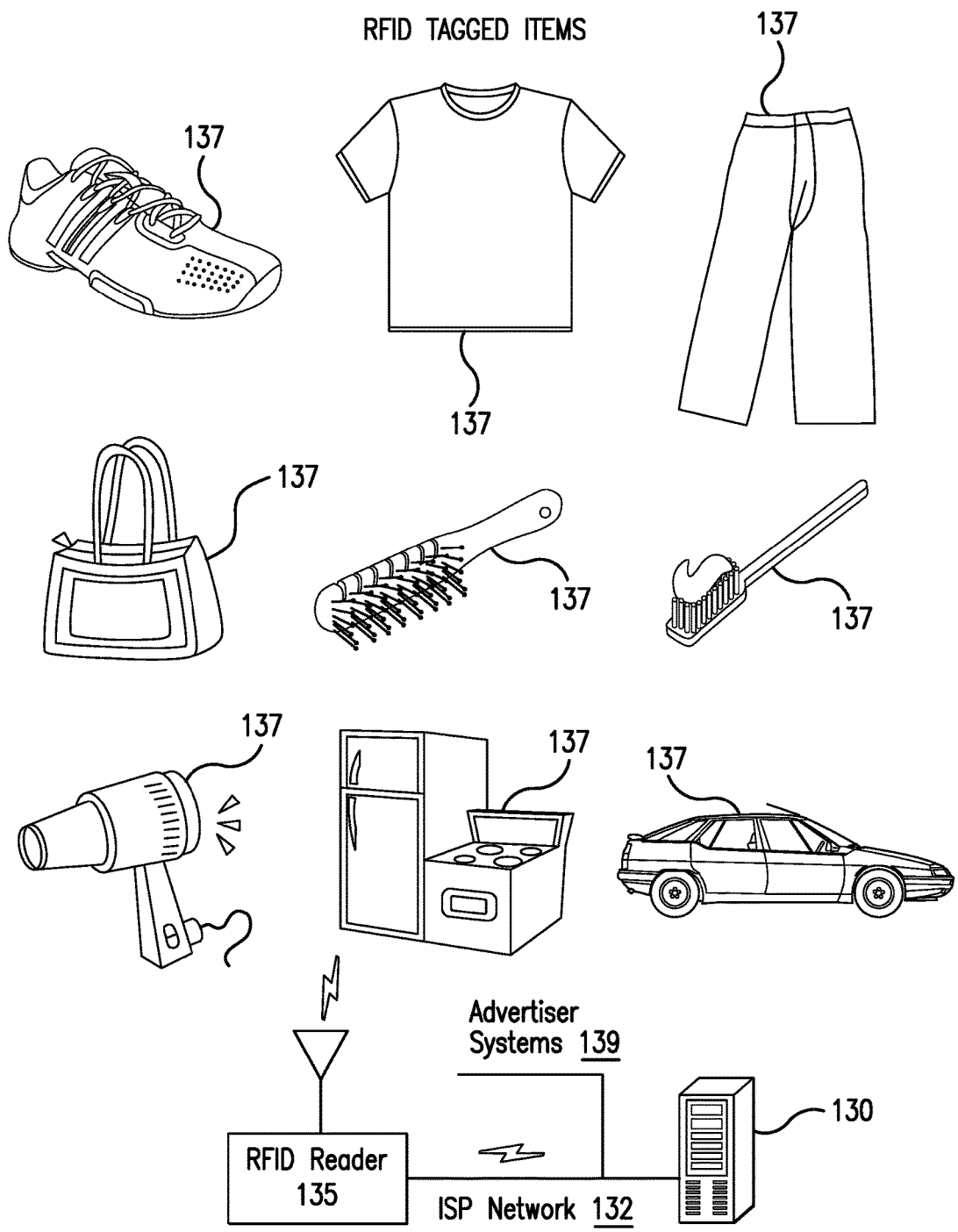
FIG. 7 depicts illustrative embodiments of items that can be monitored according to the method of FIG. 5.

FIG. 1 depicts an illustrative embodiment of a first communication system 100 for delivering media content. Communication system 100 can also be operable to monitor usage of an assortment of items. Communication system 100 can monitor usage from wireless sensors such as a radio frequency identifier (RFID) tag coupled to each item. Usage information supplied by an RFID tag can be used to measure utilization of the item and therefrom a determination can be made whether replacement of the item is warranted. The type of items that can be measured for usage can be expansive. For example, the communication system 100 can be operable to measure the usage of apparel, appliances, shoes, handbags, toiletries, and so on, such as shown in FIG. 7. Other items are contemplated by the present disclosure.

Returning to FIG. 1, the communication system 100 can represent an Internet Protocol Television (IPTV) media system. The IPTV media system can include a super headend office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Communication system 100 can also provide for all or a portion of the computing devices 130 to function as a server for monitoring usage of an assortment of items (herein referred to as server 130). The server 130 can use computing and communication technology to perform function 162, which can include among things, monitoring usage of an assortment of RFID tagged items 137. The RFID tagged items 137 can include passive or active RFID technology which can be prompted to supply usage information to an RFID reader 135 such as shown in FIG. 1. Passive RFID technology can represent an RFID tag that can be powered by a radio frequency signal generated by the RFID reader 135 and therefrom generate a corresponding radio frequency wave that includes information which can be detected by the RFID reader 135. Active RFID technology can represent an RFID tag which has its own source of power (e.g., battery powered). In either case, the data supplied by the RFID tag can be received by the RFID reader 135. The RFID reader 135 in turn can be coupled to the ISP network 132 by way of a wired Ethernet connection provided by gateway 104 or by wireless means such as WiFi. By way of the ISP network 132, the RFID reader 135 can convey to the server 130 the usage information received from the RFID tagged items 137 for processing.

Each of the RFID tagged items 137 can include a memory for storing information which can be used for determining usage of the item. The information stored can include among other things a purchase price at a time when the first item was purchased, an identification of a merchant who sold the first item, a date when the first item was sold, a description of the first item, and a description of warranty information associated with the first item. The RFID tagged items 137 can further include sensor technology to measure usage of the item. The sensor technology can include without limitation a motion sensor, a weight sensor, and a location sensor. The usage information derived from these sensors can include motion data, weight data, and location data. Other sensors such as temperature sensor, a pressure sensor or other forms of sensing devices which can produce data that can be used to measure the wear and tear of an item are contemplated by the present disclosure.

The server 130 can measure usage of the tagged RFID items 135 from the supplied usage information. The server 130 can also monitor behavioral patterns from the usage information and behavior of users of the items. In one embodiment, the server 130 can determine whether the item should be replaced according to the measured usage and the detected usage patterns and behavior of the user. The media processors 106 and wireless communication devices 116 can be adapted with software functions 162 and 164, respectively, to utilize the services of server 130.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

The server 130 can also be operable to receive promotional materials from the advertiser systems 139 of FIG. 1. The advertiser systems 139 can utilize server technology similar to servers 130, and can be communicatively coupled to server 130 by way of the ISP network 132. Each of the advertiser systems 139 can be operated and supervised by unaffiliated promoters. The promotional materials supplied by the advertiser systems 139 can be used by the server 130 to identify and present to users replacement items.

Figure 2:
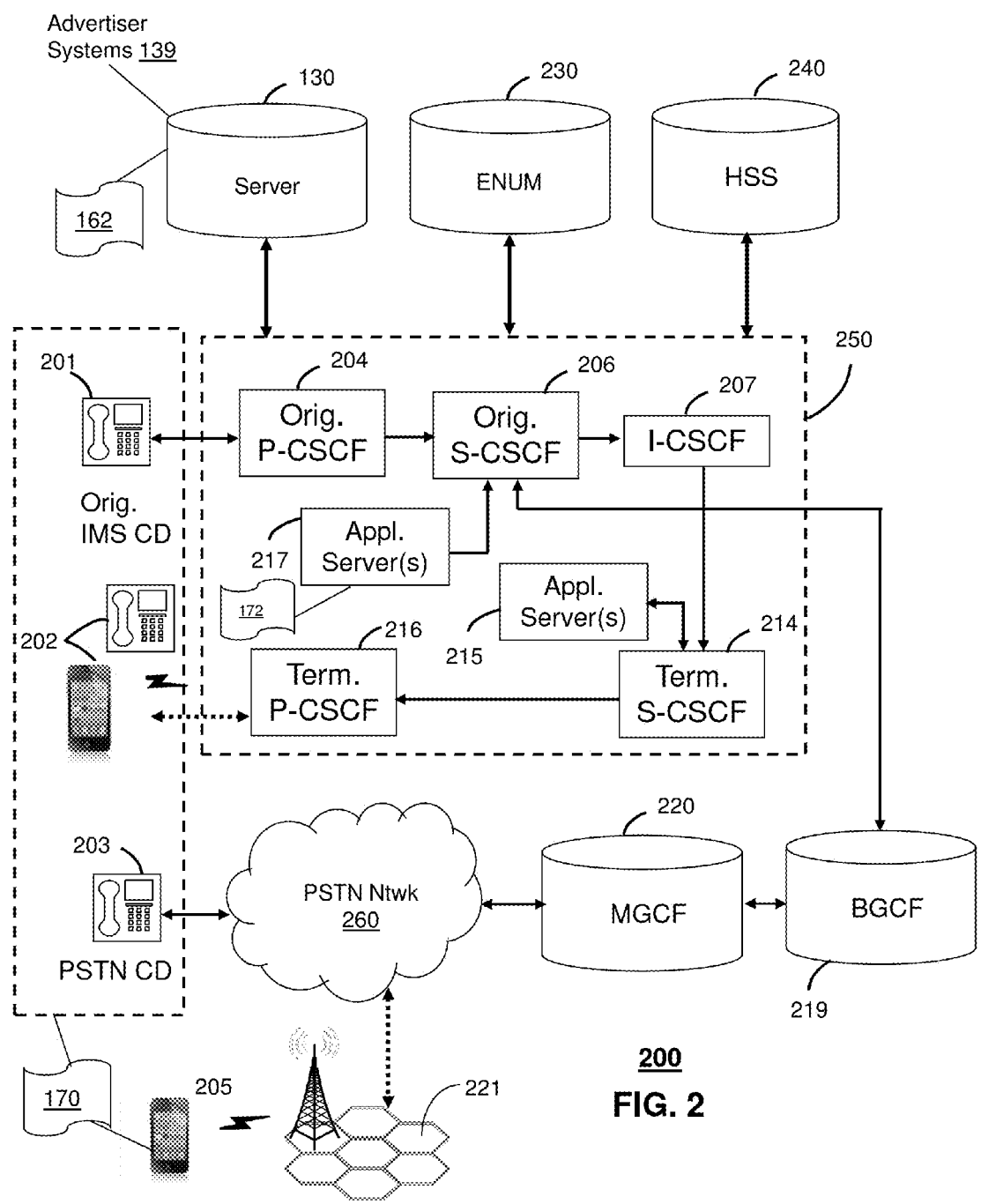

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

The server 130 of FIG. 1 can be operably coupled to the second communication system 200 for purposes similar to those described above. It is further contemplated by the present disclosure that server 130 can perform function 162 and thereby provide monitoring services to the CDs 201, 202, 203 and 205 of FIG. 2. CDs 201, 202, 203 and 205, which can be adapted with software to perform function 170 to utilize the services of the server 130. It is further contemplated that the server 130 can be an integral part of the application server(s) 217 performing function 172, which can be substantially similar to function 162 and adapted to the operations of the IMS network 250.

Figure 3:
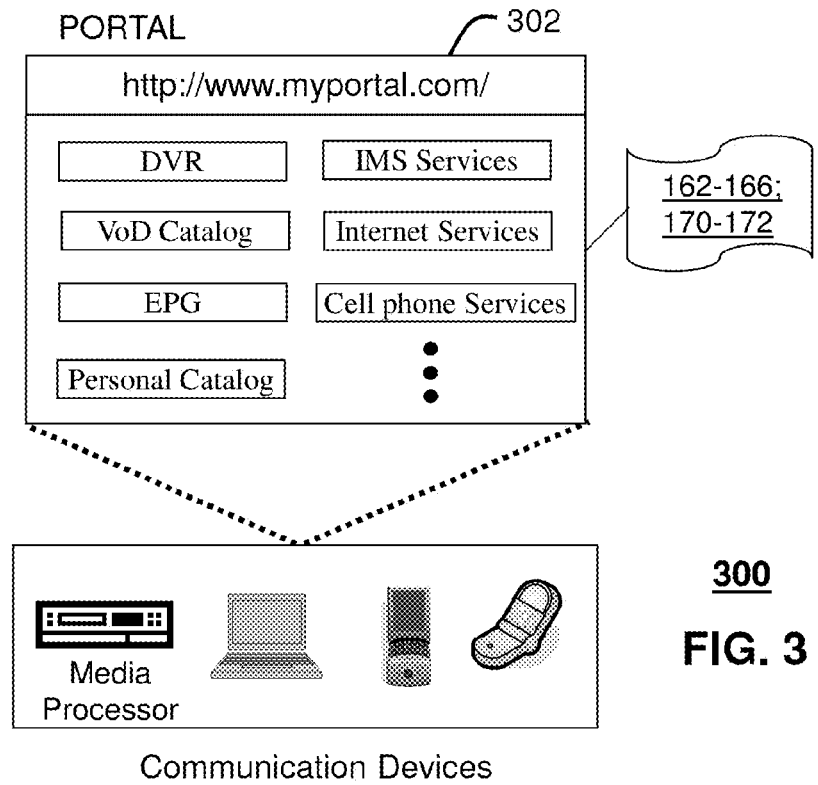
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-166, and 170-172 to adapt these applications as may be desired by subscribers and service providers of communication systems 100-200.

Figure 4:
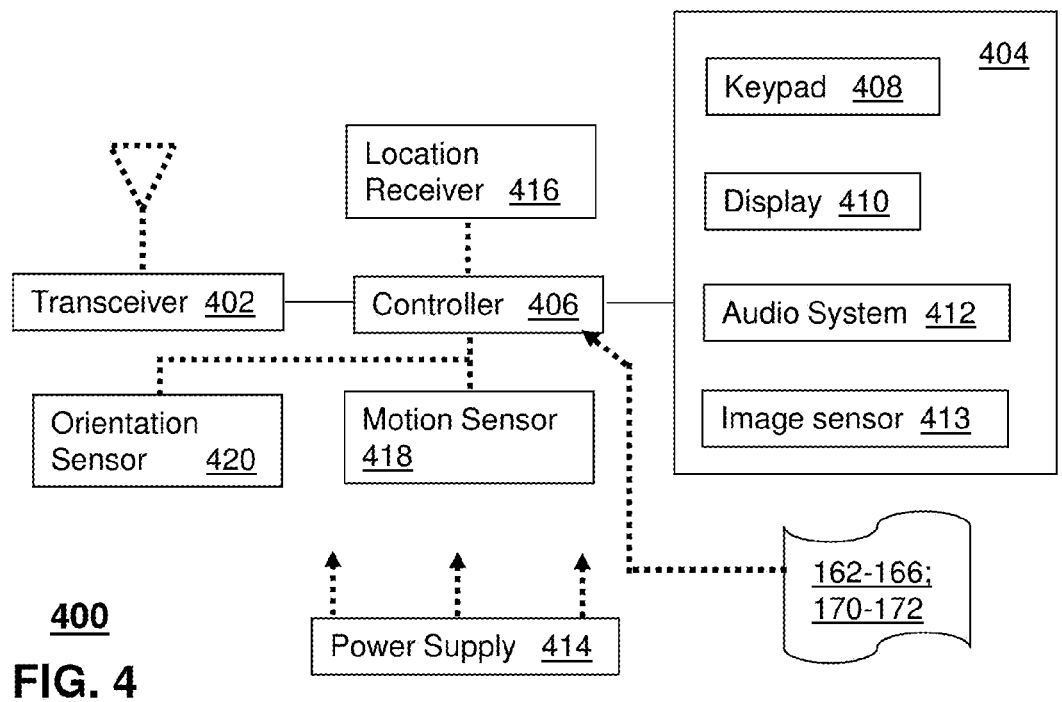
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a compass to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the present disclosure that the communication device 400 shown in FIG. 4 or portions thereof can serve as a representation of one or more of the devices of communication systems 100-200.

It is further contemplated that the controller 406 can be adapted in various embodiments to perform the functions 162-166 and 170-172, respectively. It is further contemplated that the communication device 400 can represent the RFID reader 135 and an RFID tag of the RFID tagged item 137 of FIGS. 1 and 6. The RFID reader 135 can, for example, include the transceiver 402, controller 406, and power supply 414 portions of FIG. 4. The RFID tagged item 137 can include similar components. For RFID tagged items 137 that measure usage of the item, sensors can also be added to communication device 400. The sensors can be of any type such as a temperature sensor, a humidity sensor, a lighting sensor, a pressure sensor, a motion sensor, an orientation sensor (e.g., compass), a location sensor (e.g., GPS), an image sensor, a weight measurement sensor, and so on.

Figure 5:
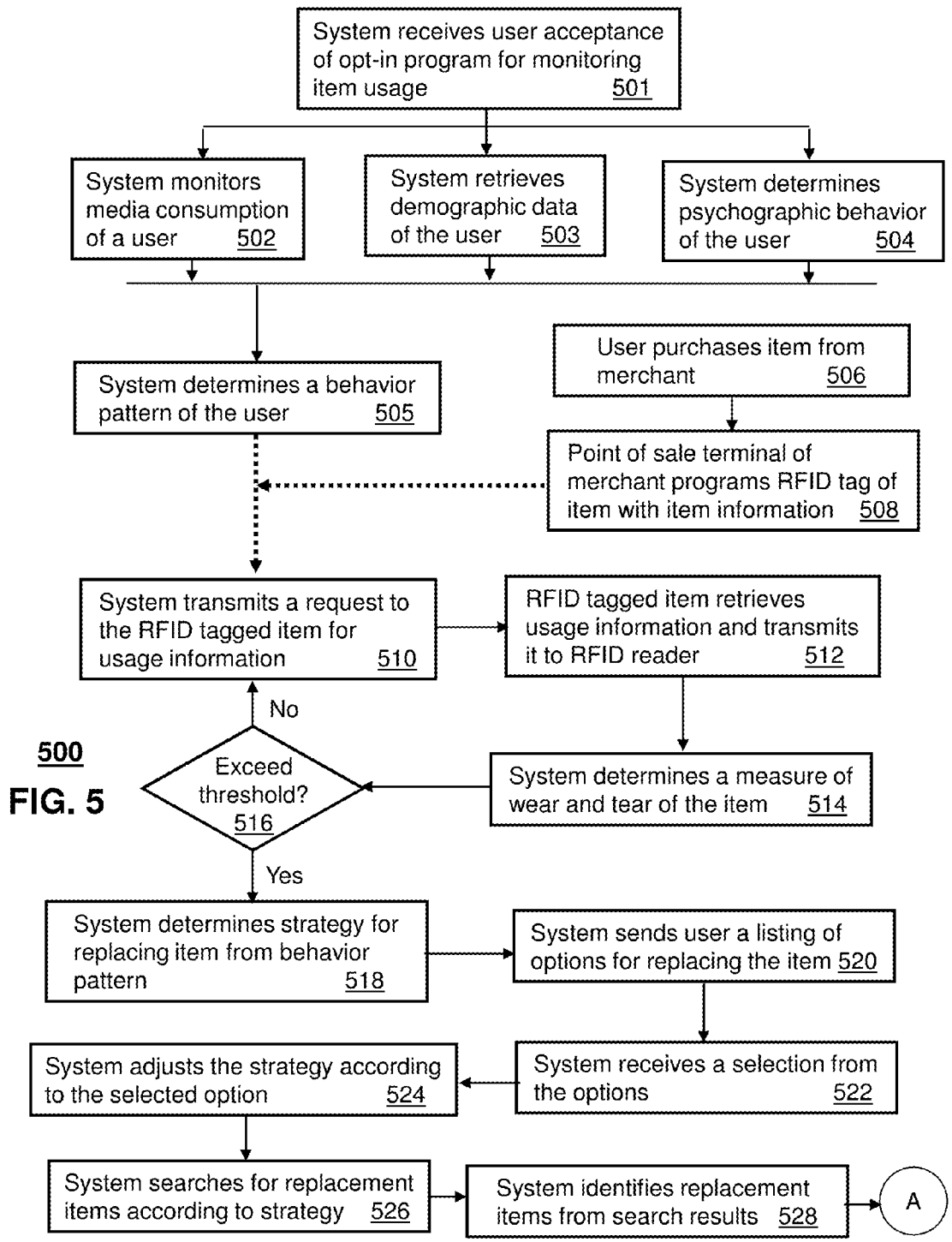
FIGS. 5-6 depict illustrative embodiments of methods operating in portions of the systems described in FIGS. 1-5.
Figure 6:
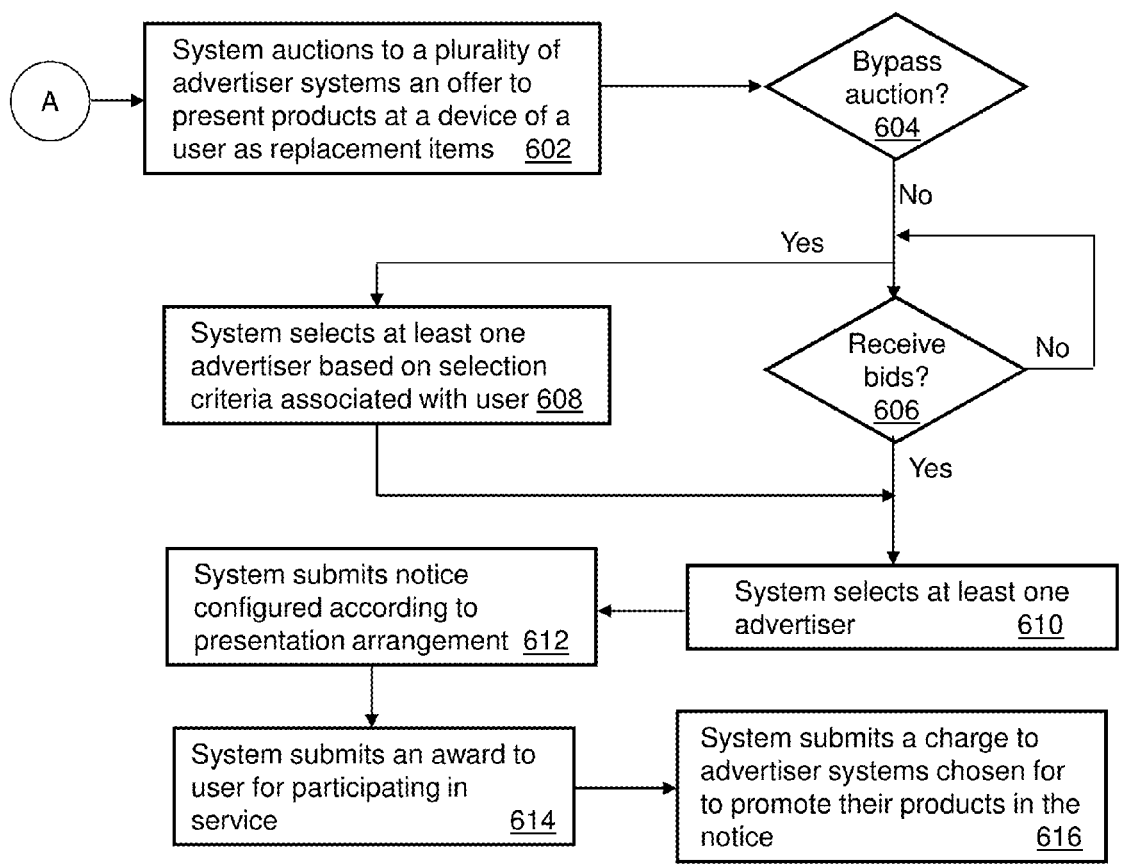

FIGS. 5-6 depict illustrative methods 500-600 that operate in portions of the devices of FIGS. 1-4. The system can be represented by the server 130 for interacting with the media processor 106, mobile devices 116, or combinations of other communication devices of a user. For illustration purposes, the system will be represented by the server 130 for describing the steps of method 500. Method 500 can begin with step 501 in which the server 130 receives user acceptance of an opt-in program in which the server 130 monitors usage of consumer items by the user and conveys certain information to promoters of products or services.

This program can be communicated to a communication device of the user by way of a communication means such as email, SMS or MMS message, or other suitable electronic delivery systems. The user can accept the service by selecting a selectable GUI button (e.g., "Accept" button) via for example the UI 404 of the user's communication, which causes the communication device to convey the acceptance to the server 130. The user can be motivated to accept the service based on monetary (remittance) awards offered by the server 130 (which can be credited to an account of the user) each time a product is promoted to the user. Similarly, the server 130 can offer coupons, guaranteed discounts, or other incentives to motivate the user to join the service. In another embodiment, the services of the server 130 can be procured by the user directly without soliciting the user.

Once the user is subscribed to the services of the server 130, the server 130 can proceed to step 502 where it monitors media content consumed by a user. The server 130 can be informed of media consumption by way of prompting or proactively receiving messages from the media processor 106, and mobile devices 116 of FIG. 1. The media content consumed by a user can indicate certain behavior patterns such as the user follows sports, the user likes certain types of sports, the user likes a particular team, and so on. TV shows consumed can indicate that the user likes certain TV episodes, which may provide an indication of the user's age group if not known, personality traits, generational traits (conservative, moderate, or liberal). News channels viewed by the user can indicate political affiliations of the user, and/or a stronger interest for international news. Audio content consumed by the user (e.g., music, radio) can also provide indications of the user's traits, music interests (like's 70's music), musicians of interest, and so on.

In step 503, the server 130 can retrieve demographic data of the user from subscriber account(s) of the communications systems 100-300. The demographic data can include the user's age, income bracket, family size, marital status, credit history, and so on. In step 504, the server 130 can combine demographic data of step 503 with media consumption data of step 502 to ascertain traits of the user that can be used to model a psychographic behavior of the user. Psychographic behavior can be used to predict traits and habits of the user. Such traits can be used by the server 130 to detect that the user's biases may be changing. For example, psychographic information might be helpful to predict that the user's taste for previously purchased apparel may be changing.

In addition to monitoring media consumption in step 502, the server 130 can also be operable to more broadly monitor consumption of goods or services by way of on-line purchases. The server 130 can also be adapted to track purchases made by the consumer such as wearables (e.g., clothing, jewelry), carry-ons (e.g., wallet, purse), electronics (e.g., smart phone, computer, tablet), appliances (refrigerator, dishwasher, microwave), transportation (e.g., ticket for commuter train, purchase of a car or motorcycle), and so on. Purchases can be tracked by detecting a purchased item with an RFID tag as will be described below. The server 130 can also be adapted to monitor social networks of the user and determine therefrom the user's friends and/or family and behaviors associated with this social network. The server 130 can further track the whereabouts of the user with GPS coordinate information provided by portable devices as described in FIG. 4.

The collected data described above can be used by the server 130 to determine a behavior pattern of the user in step 505. The server 130 can use behavior modeling techniques (such as regression analysis) to predict a user's likely behavior under certain circumstances and collect and update this model periodically in step 505. Steps 501-505 can occur as background activities that the server 130 conducts periodically.

When a user purchases an item in step 506, a merchant can program an RFID tagged item 137 by way of a point of sale terminal. A point of sale terminal can represent, for example, a barcode scanner that is portable or attached to a fixed structure. The point of sale terminal can be equipped with an RFID reader 135 such as shown in FIGS. 1 and 6 for exchanging messages with the RFID tagged item 137 of FIG. 7. When an item is purchased and consummated by way of a cash or credit transaction, the RFID reader 135 of the point of sale terminal can be directed to transmit an RF signal at step 508 that includes information to be stored in the RFID tagged item 137. The information can include among other things a purchase price at a time when the item was purchased, an identification of the merchant who sold the item, a date when the item was sold, at time when the item was purchased, a description of the item, and a description of warranty information associated with the item. The RFID tagged item 137 can store the information supplied by the point of sale terminal in non-volatile memory for later usage.

At step 510, the server 130 can transmit a request to the RFID tagged item 137 for usage information. The RFID reader 135 can be directed by the server 130 to periodically broadcast an RF message to all items in a location (e.g., a household, business, public settings such as train station, retail store, street crossing, etc.) to ascertain the status of each item. For new RFID tagged items 137 not previously detected, these items will transmit usage information for the first time, which the server 130 will identify as a new item. The server 130 can use the information describing newly detected items purchased by the user as additional data to determine the user's behavior patterns in step 505. For previously detected RFID tagged items 137, the server 130 can use the usage data for determining wear and tear of the item as described below.

Communications between the server 130 and the RFID reader 135 can occur over the ISP network 132 over a wireline interface (e.g., DSL) or over a cellular network 117 communicatively coupled to the ISP network 132 such as shown in FIG. 1. Upon receiving the server request, the RFID reader 135 can transmit an RF signal to the RFID tagged item 137 to prompt transmission of usage information. For passive RFID tagged items 137, the RF signal powers the RFID tag to transmit a responsive RF signal that can include the requested information.

For active RFID tagged items 137, which have their own source for power (e.g., battery-powered RFID tag), more sophisticated responses can be expected. For example, active RFID tagged items 137 can be equipped with sensors to measure usage of the item. The sensor technology can include without limitation a motion sensor (e.g., accelerometer, gyroscope), a weight sensor, an orientation sensor (e.g., compass), and a location sensor (e.g., GPS). The usage information derived from these sensors can include motion data, weight data, orientation data, and location data. Other sensors such as temperature sensor, a pressure sensor or similar devices which can produce data that can be used to measure the wear and tear of an item are contemplated by the present disclosure. These sensors can be directed by the active RFID tagged item 137 to periodically sense information which can be recorded in a non-volatile memory of the active RFID tagged item 137.

For example, in the case of an RFID tagged item 137 such as a sneaker shown in FIG. 7, a motion sensor coupled to an active RFID tag of the RFID tagged item 137 can be used to track how many steps a user of the sneaker takes on each usage event. The active RFID tag of the sneaker can detect via the motion sensor an initial motion (e.g., a user placing his/her foot in the sneaker) which begins the monitoring process to measure how many footsteps are taken by the user. When the sneaker is detected to be in a standstill state (e.g., user removes sneaker), the active RFID tagged item 137 can cease the monitoring process and switch to a sleep mode state (i.e., nearly no processing—except for a periodic monitoring of activities by way of the motion sensor) to extend battery life. The RFID tagged item 137 (in this illustration the sneaker of FIG. 7) can supply the aggregate number of footsteps measured to the RFID reader 135 in step 512 which the RFID reader 135 submits to the server 130. In step 512, the RFID tagged item 137 can also provide information recorded at the time of purchase (e.g., date of purchase, description of merchant) such as described at step 508. The server 130 can determine at step 514 a measure of wear and tear of the item from the total number of footsteps taken and/or the point of sale information provided by the RFID tagged item 137.

In one embodiment, the RFID tagged item 137 (continuing with the illustration of the sneaker of FIG. 7) can be equipped with yet more sensors which can provide a more accurate measure of wear and tear. For instance, the sneaker can be equipped with a location sensor to track the whereabouts of the user. The sneaker can also be equipped with a pressure sensor that measures the impact the sneaker has on the ground. The location information if supplied to the server 130 in step 512 can be used to determine the terrain where the sneaker was used. For example, the server 130 can determine that the sneaker was used on grass terrain to determine the degree of wear and tear applied to the sole of the sneaker. The impact data supplied by a pressure sensor can be used by the server 130 to more accurately determine a measure of wear and tear.

At step 516, the server 130 can be operable to compare the measured wear and tear of the sneaker with a predetermined threshold. The measured wear and tear can represent a measure of how much the sole of the sneaker has been worn down (e.g., loss in X millimeters of thickness). The wear and tear measurement can also be determined from the age of the sneaker or expiration of a warranty, which can be determined from a comparison of the date when the measurement is taken and the purchase date recorded in the RFID tagged item 137 by the point of sale terminal. The threshold can be established by the manufacturer of the sneaker or by an objective third party (such as a consumer not-for-profit organization) that presents thresholds that are viewed as unbiased. The threshold can represent an acceptable measure of wear and tear, a maximum age of the sneaker, or other suitable metrics for detecting when a need exists to replace a consumer item. If, for example, the threshold is not exceeded (e.g., the sneaker has not been frequently worn and/or the sneaker has not exceeded an end of life age limit), the server 130 can proceed to step 510 and repeat the monitoring process at a later time (e.g., a week later). If the threshold is exceeded (e.g., the sneaker has lost too much sole and/or has exceeded its end of life age limit), the server 130 can proceed to step 518 where it determines a strategy for replacing the item from the behavior pattern of the user determined in step 505.

The server 130 can predict from the behavior pattern a desire of the user to replace the item with an upgrade of the item, a downgrade of the item, or a substantially similar item. The server 130 can predict from the behavior pattern, for example, that the user is ready to move on to a more expensive pair of sneakers. This determination can be influenced from an improvement in the user's credit line and an increase in consumption of media services of the systems 100-200, which may indicate an increase in the user's disposable income. Alternatively, the server 130 can predict from the behavior pattern of the user that the user's disposable income has been reduced and therefore a downgrade may be of interest to the user. If the user's economic circumstances are substantially unchanged, then the server 130 may predict that the user would likely prefer a similar model sneaker.

There can be many other factors that the server 130 may take into consideration in predicting a strategy that is not solely driven by income. For example, the psychographic behavior of the user may indicate that the user's interest in sneaker models has changed influenced by media consumption and/or the behavior of the user's social network of friends and/or family. For example, an exchange of instant messages, SMS messages, or other forms of communication between friends may indicate that the user's friends are attracted to a new style of sneakers. The server 130 can also determine that a change in age of the user may warrant a different sneaker model based on profiling of sneaker models by age groups.

From the above example embodiments, it should be apparent that the strategy chosen by the server 130 can substantially vary from user to user. To assure that the predicted strategy is correct, the server 130 can proceed to step 520 where it submits to the user a listing of options for replacing the item that reflect the strategy chosen by the server 130. The options may be presented at any device of the user (e.g., STB 106, mobile phone 116, and so on) as an inquiry. The options presented are intended to describe the proposed strategy of the server 130 and leave open the possibility for the user to make adjustments. For example, the server 130 can send an inquiry to the user requesting an acknowledgment that the user would consider a more expensive product line of sneakers. The inquiry can also request acknowledgment that the user would be interested in certain model types (without necessarily listing specific manufacturers). The user can respond in the affirmative or reject certain proposals and provide counterproposals. The server 130 can continue with this line of inquiries until it has affirmed its predictions, or has adjusted its predictions to the user's feedback in steps 522-524.

In step 526, the server 130 can search databases to determine which sneaker models most closely match the strategy chosen by the server 130. At step 528, the server 130 can identify one or more replacement products according to the search results. The server 130 can then proceed to step 602 of FIG. 6 where it auctions to a plurality of advertiser systems 139 of FIG. 1 an offer to present sneakers at a device (e.g., mobile phone, set-top box, computer, etc.) of the user as a replacement item. The offer submitted in step 602 can describe sneaker models identified in step 528 along with a price range that the server 130 assesses to be acceptable to the user based on the demographic and/or psychographic information gathered about the user.

The user can provision the server 130 by way of the portal 302 with preferences of the user for certain advertisers (e.g., Nike™, and New Balance™). The server 130 can also analyze a history of purchases made by the user which can indicate a bias towards a particular advertiser. The server 130 can also monitor competitive sale prices offered by the advertisers. In step 604, the server 130 can bypass the auctioning process and select in step 608 certain advertisers based on preferences of the user, the user's purchasing history, and/or competitive sale prices offered by the advertisers. Bypassing the auctioning process can be viewed as a preferred status for a subset of advertisers.

For the remaining advertisers who are unable to bypass the auctioning process, the server 130 can choose a subset of the remaining advertiser systems 139 from which to collect bids. The subset of advertiser systems 139 can be selected according to a history of products purchased by the user from a subset of a plurality of advertisers, a first list of advertisers blocked to participate in an auction, and/or a second list of advertisers authorized to participate in the auction. These lists can be created by the user when provisioning the services of the server 130, or the server 130 can create the lists based on behavior patterns of the user. The bids collected in step 606 can represent fees offered to the service provider of the server 130 by each advertiser system 139 to procure access to presenting the user a replaceable item. In step 610, the server 130 can select one or more winning bids according to the fees offered to the service provider and other relevant factors such as whether the user has a history of purchasing products from the advertiser associated with the advertiser system 139 submitting the bid.

The fees presented in the bid can also be used to purchase a preferred presentation arrangement of the replacement product (in this illustration a sneaker model). For example, the fee offered in each bid can be used to rank the order of products presented by each advertiser. Other factors can be considered in the presentation arrangement such as a sale price of each product of the advertisers, and a degree of a match in similarity between the product of each advertiser and the replacement item identified in step 528 of FIG. 5. The server 130 can also determine whether it would be helpful to the user to purchase the proposed sneaker at the same retailer where user purchased the sneaker that now needs to be replaced. This determination can be based on pricing by the retailer of the models selected by the server 130 as compared to other retailers selling the same model. In one embodiment, the server 130 can also provide on-line purchase options for direct delivery to the user without requiring the user to visit a physical establishment. In step 612, the server 130 can construct a notice that presents each advertiser's product according to a presentation arrangement as described above. The server 130 can submit this notice as an email, an SMS or MMS message, or other suitable means of communication directed to a communication device of the user.

In step 614, the server 130 can remit an award to the user by crediting an account of the user. Alternatively, or in combination, the server 130 can submit coupons or provide guaranteed discounts to the products presented to the user in the notice. The awards given to the user can be based on each advertiser given access to the user, or on a collective award per notice presented to the user. In step 616, the server 130 can also transmit a charge to a subset of the advertiser systems 139 given access to the user. The charges are directed to each advertiser whose product is promoted in the notice. The fee charged to each advertiser can be based on an assessed commercial value of the user. The commercial value of the user can be determined from, for example, monitored behavior that indicates the user frequently consumes goods or services. The commercial value can be also assessed from collected demographic and psychographic data of the user.

Upon reviewing the aforementioned embodiments, it would be evident to an artisan with ordinary skill in the art that said embodiments can be modified, reduced, or enhanced without departing from the scope and spirit of the claims described below. Method 500 as described above can be applied to any item that can be equipped with a passive, active or other suitable form of an RFID tag. For instance, method 500 can be adapted to monitor usage of apparel, hand bags, hair brushes, tooth brushes, blow dryers, appliances, automobiles, and so on such as shown in FIG. 7. Additionally, these items can be equipped with any form of sensing devices that can enhance the ability of the server 130 to more accurately determine the usage of the item. Method 500 can also be adapted so that the server 130 and the RFID reader 135 are housed in the same device and located at the user's residence, work place, or in other locations which can track the user's items. Other embodiments are contemplated by the present disclosure.

Method 500 can be further adapted so that the server 130 is operable to account for health factors of the user. For example, the server 130 can monitor whether the user has gained weight or lost weight. The server 130 can monitor a change in weight by retrieving medical records of the user, or from sensor data supplied by a weight or pressure sensor coupled to an RFID tagged item 137 such as a shoe. A change in the user's weight can be used as a factor by the server 130 to search for replaceable items. Other health factors that can be considered by the server 130 such as a change in height of the user, a diagnosis of a disease (e.g., diabetes) that may require a change in apparel (e.g., shoes, socks), and so on.

Method 500 can also be adapted so that the server 130 is operable to monitor the user's disposal of RFID tagged items 137. A waste basket can be equipped with an RFID reader 135 that detects the presence of an RFID tagged item 137 in the basket. Disposal of the RFID tagged item 137 can also be detected with location coordinates provided by a location sensor (e.g., GPS sensor) of the RFID tagged item 137, which may indicate the RFID tagged item 137 is in the location of a waste basket which is generally not relocated. An RFID tag with a location sensor can be added to the waste basket. The server 130 can be adapted to compare the location of the waste basket and the RFID tagged item 137 according to location coordinates received from the basket and the RFID tagged item 137. If a match exists, a disposal can be detected. Other methods for detecting the disposal of an RFID tagged item 137 can be used.

Once the server 130 detects the disposal of an RFID tagged item 137, it can retrieve usage information to make additional determinations that may be useful in assessing replacement items. For example, the server 130 can determine that the disposal was premature and compare the user's next purchase of a similar item to determine why the user may have disposed the item. For example, the server 130 may detect that a new purchase differs from the disposed item in size (e.g., larger shoe size). This determination can be used by the server 130 to track the user's physiological changes. The server 130 can also retrieve the usage information from the disposed RFID tagged item 137 and determine that the item experienced wear and tear that exceeded the manufacturer's expected wear and tear threshold. The server 130 can collect this information and determine a wear and tear profile of the user (e.g., excessive or light user of certain consumer items) that may be different than the manufacturer's model. The wear and tear profile of the user can be used for determining replacement items as well as for predicting a threshold for end of life of the consumer item.

Method 500 can also be adapted to search for complementary products or services. That is, the server 130 can be operable to search not only for replacement items, but products or services that compliment the replacement item. For example, the server 130 can be operable to search for sports apparel that matches a sneaker replacement model, and/or sports services or events that match the user's interest in sports activities (e.g., gym services, community services offering team sports which the user can join, tickets to sporting events which may be of interest to the user, etc.). Method 500 can be adapted to auction the complimentary products or services to the advertiser systems 139 as previously described.

Method 500 can also be adapted so that a trusted entity (e.g., a not-for-profit entity that assesses retailers and/or manufacturers) provides data to the server 130 to enhance the selection process of advertisers. In another embodiment, method 500 can also be adapted so that a population of users subscribed to the services of the server 130 provides the server 130 feedback about their satisfaction with certain retailers and/or manufacturers of consumer products and/or services. The feedback can be solicited feedback based on surveys supplied to the users by the server 130. Alternatively, or in combination, the server 130 can monitor communications of social networks to assess trends and likes and dislikes of certain consumer items and/or services. Such feedback and/or monitored trends can also be used by the server 130 to select advertisers.

Figure 8:
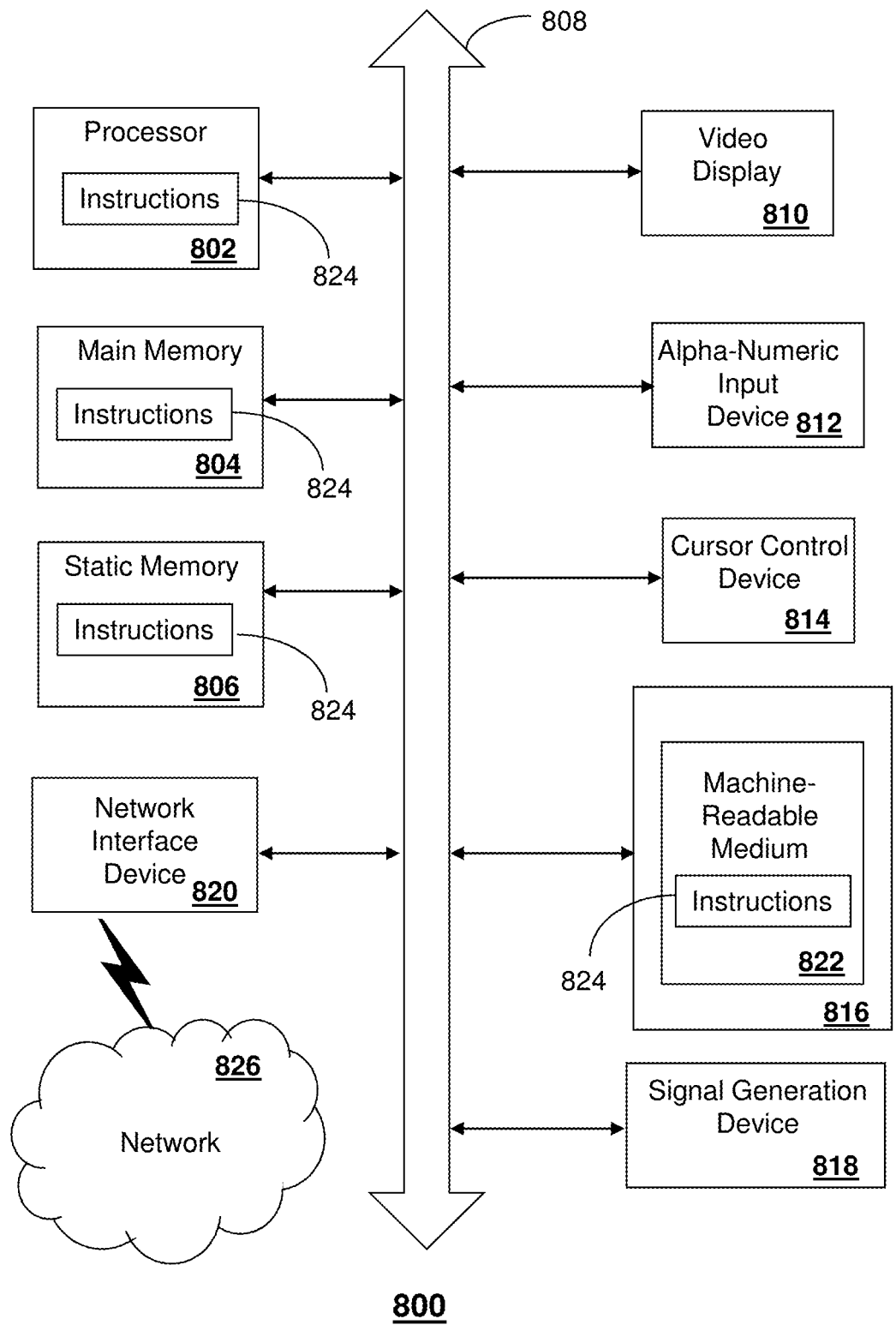
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the server 130, media processor 106, the RFID reader 135, the RFID tags carried by the RFID tagged items 137, and other devices of FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
    a first transceiver;
    a processing system including a processor; and
    a memory that stores executable instructions that, when executed by the processing system, facilitate performance of operations, the operations comprising:
        accessing consumption information associated with a user;
        generating a behavior pattern model associated with the user based on regression analysis of the consumption information associated with the user;
        directing the first transceiver to transmit a first radio frequency signal to a first item;
        directing the first transceiver to receive a second radio frequency signal from the first item, wherein the second radio frequency signal is generated by a radio frequency identifier (RFID) tag carried by the first item responsive to the first item receiving the first radio frequency signal from the first transceiver, wherein the RFID tag comprises an RFID memory;
        accessing usage information from the second radio frequency signal that is received from the first item, wherein the usage information is generated according to: a usage quantity that is sensed periodically by a first sensor at the first item, a usage condition that is sensed periodically by a second sensor at the first item, wherein the usage information is recorded within the RFID memory, and point of sale information that had been recorded in the RFID memory at a time of purchasing of the first item responsive to receipt of data by the RFID tag via a third radio frequency signal from a second transceiver of a point of sale terminal of a merchant;
        comparing the usage quantity to a threshold to obtain a comparison result;
        detecting a need to replace the first item according to the usage information based on the comparison result;
        accessing, via a social media network, a message associated with a social media group of the user, wherein the user has used the first item and wherein the user is a member of the social media group;
        determining, from the message associated with the social media group, an interest in a type of replacement item for the first item, wherein the interest is associated with the social media group;
        determining a search scheme to replace the first item according to the interest in the type of replacement item responsive to detecting the need to replace the first item, wherein the search scheme is based on a prediction, determined from the interest in the type of replacement item and the behavior pattern model, of a desire of the user to replace the first item with the type of replacement item;
        searching a plurality of replacement items according to the search scheme;
        identifying one replacement item from results of the search;
        determining whether to bypass an auctioning process for one of a plurality of advertisers based on a preferred status, wherein the preferred status comprises a preference of the user for the one of the plurality of advertisers, purchases made by the user of a product from the one of the plurality of advertisers, a sale price for the product from the one of the plurality of advertisers, or any combinations thereof;
        responsive to determining that preferred status exists, selecting the one of the plurality of advertisers;
        initiating the auctioning process for a remainder of the plurality of advertisers for a proposal for replacing the first item with a replacement item of the remainder of the plurality of advertisers;
        selecting a subset of the remainder of the plurality of advertisers based on a selection criteria of the user;
        selecting, based on arrangement criteria, a presentation arrangement for a notice for replacing the first item with replacement items from the one of the plurality of advertisers and the subset of the remainder of the plurality of advertisers;
        generating the notice, wherein the notice includes the presentation arrangement for the one of the plurality of advertisers and the subset of the remainder of the plurality of advertisers; and
        causing transmission of the notice to a communication device of the user.

2. The device of claim 1, wherein the operations further comprise:
    receiving a plurality of bids from each of the remainder of the plurality of advertisers; and selecting the subset of the remainder of the plurality of advertisers according to the plurality of bids received.

3. The device of claim 2, wherein the operations further comprise selecting the subset of the remainder of the plurality of advertisers according to a ranking order of the plurality of bids received.

4. The device of claim 2, wherein the presentation arrangement is determined from one of the plurality of bids received, a sale price of each product of each advertiser, a degree of a match in similarity between the product of each advertiser and the one replacement item, or any combination thereof.

5. The device of claim 1, wherein the operations further comprise presenting an auction of the presentation arrangement in the notice to the remainder of the plurality of advertisers.

6. The device of claim 5, wherein the operations further comprise presenting the auction to a subset of the remainder of the plurality of advertisers according to one of a history of products purchased by the user from the subset of a plurality of advertiser systems, a first list of advertisers blocked to participate in the auction, a second list of advertisers authorized to participate in the auction, or any combination thereof.

7. The device of claim 1, wherein at the time of purchasing of the first item a point of sale terminal of a merchant transmits to the RFID tag, via the second transceiver, a third radio frequency signal comprising the point of sale information for recording in a memory of the RFID tag.

8. The device of claim 1, wherein the first item further comprises the first sensor coupled to the RFID tag, and wherein the operations further comprise:
transmitting the first radio frequency signal directed to the RFID tag, wherein the transmitting results in a transmitted first radio frequency signal; and
receiving the usage quantity from the first sensor responsive to the transmitted first radio frequency signal.

9. The device of claim 1, wherein the operations further comprise monitoring media consumption by the user of the first item, wherein the interest in the type of replacement item for the first item is further determined from the media consumption that is monitored.

10. The device of claim 9, wherein the operations further comprise:
accessing a commercial value of the user to a plurality of advertisers for promoting products to the user; and
determining a fee to charge an advertiser of the plurality of advertisers according to the commercial value.

11. The device of claim 10, wherein the operations further comprise transmitting a charge to an advertiser system of the advertiser upon transmission of the notice to the device of the user.

12. The device of claim 1, wherein the operations further comprise determining a behavior pattern of the user according to one of psychographic data, demographic data, or any combination thereof.

13. A method, comprising:
generating, by a processing system including a processor, a behavior pattern model associated with a user based on regression analysis of consumption information associated with the user;
transmitting, by the processing system, a first radio frequency signal to a first item;
receiving, by the processing system, a second radio frequency signal from a radio frequency identifier tag carried by the first item responsive to the first radio frequency signal, wherein the radio frequency identification (RFID) tag comprises an RFID memory;
retrieving, by the processing system, from the first radio frequency signal, usage information about the first item, wherein the usage information is generated according to a usage quantity that is sensed by a first sensor at the first item, a usage condition that is sensed by a second sensor at the first item, and point of sale information that had been recorded within the RFID memory, at a time of buying of the first item, responsive to receipt of data by the RFID tag via a third radio signal from a transceiver of a point of sale terminal of a merchant;
accessing, by the processing system, a message associated with a social media group of the user, wherein the user has used the first item and wherein the user is a member of the social media group;
determining, by the processing system, from the message associated with the social media group, an interest in a type of replacement item for the first item, wherein the interest is associated with the social media group;
determining, by the processing system, a strategy to replace the first item according to the interest in the type of replacement item and the behavior pattern model;
determining, by the processing system, a search scheme to replace the first item responsive to the usage information according to the interest in the type of replacement item, wherein the search scheme is based on a prediction, determined from the interest in the type of replacement item and the behavior pattern model, of a desire of the user to replace the first item with the type of replacement item;
searching, by the processing system, a plurality of replacement items according to the search scheme;
identifying, by the processing system, one replacement item according to results of the search;
determining, by the processing system, whether to bypass an auctioning process for one of a plurality of advertisers based on a preferred status, wherein the preferred status comprises a preference of the user for the one of the plurality of advertisers, purchases made by the user of a product from the one of the plurality of advertisers, a sale price for the product from the one of the plurality of advertisers, or any combinations thereof;
responsive to determining that preferred status exists, selecting, by the processing system, the one of the plurality of advertisers;
initiating, by the processing system, the auctioning process for a remainder of the plurality of advertisers for a proposal for replacing the first item with a replacement item of the remainder of the plurality of advertisers;
selecting, by the processing system, a subset of the remainder of the plurality of advertisers based on a selection criteria of the user;
selecting, by the processing system based on arrangement criteria, a presentation arrangement for a notice for replacing the first item with replacement items from the one of the plurality of advertisers and the subset of the remainder of the plurality of advertisers;
generating, by the processing system, the notice, wherein the notice includes the presentation arrangement for the one of the plurality of advertisers and the subset of the remainder of the plurality of advertisers; and
causing transmission of the notice, by the processing system, to a device of the user.

14. The method of claim 13, wherein the RFID tag is one of a passive RFID tag or an active RFID tag, and wherein the method further comprises causing, by the processing system, a notice to be transmitted to the device of the user, wherein the notice is configured according to the presentation arrangement.

15. The method of claim 13, further comprising:
auctioning, by the processing system, to a plurality of advertiser systems an offer to present at the device of the user a product according to the one replacement item; and
selecting, by the processing system, the advertiser according to a bid received from one of the plurality of advertiser systems during the auction.

16. A method, comprising:
generating, by a processing system including a processor, a behavior pattern model associated with a user based on regression analysis of consumption information associated with the user;
transmitting, by the processing system, a first radio frequency signal to a first consumer item;
receiving, by the processing system, a second radio frequency signal from a radio frequency identifier tag carried by the first consumer item responsive to the first radio frequency signal, wherein the radio frequency identifier (RFID) tag comprises an RFID memory;
accessing, by the processing system, usage information from the second radio frequency signal of the first consumer item;
determining, by the processing system, a measure of usage of the first consumer item according to the usage information, wherein the usage information is generated according to a usage quantity that is sensed periodically by a first sensor at the first consumer item, a usage condition that is sensed periodically by a second sensor at the first consumer item, wherein the usage information is recorded within the RFID memory, and point of sale information that had been recorded in the RFID memory, at a time of selling of the first consumer item, responsive to receipt of data by the radio frequency identifier tag via a third radio frequency signal from a transceiver of a point of sale terminal of a merchant;
accessing, by the processing system, a message associated with a social media group of the user, wherein the user has used the first consumer item and wherein the user is a member of the social media group;
determining, by the processing system, from the message associated with the social media group, an interest in a type of replacement item for the first consumer item, wherein the interest is associated with the social media group;
determining, by the processing system, a strategy to replace the first consumer item according to the interest in the type of replacement item and the behavior pattern model;
determining, by the processing system, a search scheme for replacing the first consumer item according to the interest in the type of replacement item, wherein the search scheme is based on a prediction, determined from the interest in the type of replacement item of a desire of the user to replace the first consumer item with the type of replacement item and the behavior pattern model;
identifying, by the processing system, according to the search scheme a second consumer item for replacing the first consumer item;
determining, by the processing system, whether to bypass an auctioning process for one of a plurality of advertisers based on a preferred status, wherein the preferred status comprises a preference of the user for the one of the plurality of advertisers, purchases made by the user of a product from the one of the plurality of advertisers, a sale price for the product from the one of the plurality of advertisers, or any combinations thereof;
responsive to determining that preferred status exists, selecting, by the processing system, the one of the plurality of advertisers;
initiating, by the processing system, the auctioning process for a remainder of the plurality of advertisers for a proposal for replacing the first consumer item with the second consumer item of the remainder of the plurality of advertisers;
selecting, by the processing system, a subset of the remainder of the plurality of advertisers based on a selection criteria of the user;
selecting, by the processing system based on arrangement criteria, a presentation arrangement for a notice for replacing the first consumer item with replacement items from the one of the plurality of advertisers and the subset of the remainder of the plurality of advertisers;
generating, by the processing system, the notice, wherein the notice includes the presentation arrangement for the one of the plurality of advertisers and the subset of the remainder of the plurality of advertisers; and
causing transmission of the notice, by the processing system, to a device of the user.

17. The method of claim 16, further comprising determining, by the processing system, an order of presentation for the second consumer item from a bid received from a plurality of advertiser systems, a sale price of the second consumer item, or a degree of a match in similarity between the second consumer item and the first consumer item.

18. The method of claim 16, wherein at the time of selling of the first consumer item a point of sale terminal of a merchant transmits to the RFID tag, via the transceiver, a third radio frequency signal comprising the point of sale information for recording in a memory of the RFID tag.

19. The method of claim 13, wherein at the time of buying of the first item a point of sale terminal of a merchant transmits to the RFID tag, via the transceiver, a third radio frequency signal comprising the point of sale information for recording in a memory of the RFID tag.

20. The method of claim 16, further comprising transmitting a charge to an advertiser system of the advertiser upon transmission of the notice to the device of the user.

* * * * *

UNITED STATES PATENT AND TRADEMARK OFFICE
CERTIFICATE OF CORRECTION

PATENT NO. : 10,402,862 B2  
APPLICATION NO. : 13/208092  
DATED : September 3, 2019  
INVENTOR(S) : Mikan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 205 days.

Signed and Sealed this  
Second Day of June, 2020

Andrei Iancu  
*Director of the United States Patent and Trademark Office*